United States Patent [19]
Battu et al.

[11] Patent Number: 6,069,766
[45] Date of Patent: May 30, 2000

[54] MINIATURE HARD DISC DRIVE HAVING LOW PROFILE ACTUATOR ARM VOICE COIL AND SPINDLE MOTORS

[75] Inventors: Ramgopal Battu, Los Angeles County; Iraj Jabbari, Santa Clara County; Sanjoy Ghose, Santa Cruz County, all of Calif.

[73] Assignee: Seagate Technology, Inc., Scotts Valley, Calif.

[21] Appl. No.: 08/968,847

[22] Filed: Nov. 5, 1997

Related U.S. Application Data

[63] Continuation of application No. 08/430,309, Apr. 28, 1995, abandoned, which is a continuation of application No. 07/893,641, Jun. 5, 1992, which is a continuation-in-part of application No. 07/477,747, Feb. 9, 1990, abandoned.

[51] Int. Cl.$^7$ ............................. G11B 17/00; G11B 5/012
[52] U.S. Cl. ............................... 360/97.01; 360/98.01
[58] Field of Search ........................ 360/105, 903, 360/97.01, 902, 98.01, 98.07, 98.08; 369/269, 75.1; 384/907.1, 491; 310/67 R

[56] References Cited

U.S. PATENT DOCUMENTS

| | | | |
|---|---|---|---|
| 3,604,962 | 9/1971 | Larson | 310/67 R |
| 3,610,714 | 10/1971 | De Gaeta | 384/425 |
| 3,963,284 | 6/1976 | Bouchard | 384/464 |
| 4,613,778 | 9/1986 | Wroboel et al. | 310/67 R |
| 4,698,542 | 10/1987 | Muller | 310/67 R |
| 4,805,055 | 2/1989 | Wright | 360/106 |
| 4,875,117 | 10/1989 | Slezak et al. | 360/98.01 |
| 4,965,691 | 10/1990 | Iftikar et al. | 360/133 |
| 5,025,335 | 6/1991 | Stefansky | 360/97.01 |
| 5,025,336 | 6/1991 | Morehouse et al. | 360/97.01 |
| 5,045,738 | 9/1991 | Hishida et al. | 369/269 |
| 5,223,993 | 6/1993 | Squires et al. | 360/97.03 |
| 5,251,082 | 10/1993 | Elliott et al. | 360/98.07 |
| 5,264,975 | 11/1993 | Bajorek et al. | 360/97.02 |
| 5,365,389 | 11/1994 | Jabbari et al. | 360/105 |
| 5,532,889 | 7/1996 | Stefansky et al. | 360/97.01 |
| 5,872,688 | 2/1999 | Battu et al. | 360/106 |

OTHER PUBLICATIONS

Costlow, Terry, "Nelin 1.8" Market "Anna" Drive Stores 85 Mbytes Electronic Engineering Times, pp. 92–93, Mar. 30, 1992.
Wirbel, Loring; "Intergral Ships First 1.8–in Drive"; Sep. 2, 1991.
"Integral Peripherals 40MB Stingray Version its 1.8" Mar. 6, 1992.
Leibson, Steven H.; Low Power 1.8 in Hard–Disk Drive Holds 21.4 Mbytes, Withstands 700g Shocks; Sep. 16, 1993.
Mallory, Jim; "Comdex: Integral Peripherals Shows 1.8–inch Hard Drive,"; Oct. 24, 1993.

*Primary Examiner*—David Davis
*Attorney, Agent, or Firm*—Flehr Hohbach Test Albritton & Herbert LLP

[57] ABSTRACT

A disc drive system having at least one hard disc of approximately 48 mm diameter having concentric tracks is supported by a hub positioned in a centrally located aperture of approximately 12 mm diameter. The disc is rotated at a constant speed by a brushless DC motor attached to the hub. A transducer means for communicating information with the hard disc is moved relative to the disc surface by a positioning means. The positioning means includes a voice coil motor for selectably and accurately positioning the transducer means over the tracks on the hard disc. The disc drive system is enclosed in a housing means constructed from ferrous material having a base portion and a shell portion. The positioning means has a shaft about which the positioning means rotates. To provide a small, rugged assembly, the shaft is mounted at each end between the shell portion and base portion of the housing. Additionally, the shaft of the brushless DC motor is mounted in the same manner. The miniature disc drive system of the invention is designed to be permanently mounted in a portable, lap-top or notebook computer. Alternatively, the design is adaptable to enable the disc drive system to be utilized as a portable memory unit which may be inserted and removed from a connector port in the host computer.

3 Claims, 18 Drawing Sheets

MINIATURE HARD DISC DRIVE HAVING LOW PROFILE ACTUATOR ARM VOICE COIL AND SPINDLE MOTORS

CROSS-REFERENCE TO RELATED APPLICATIONS

This application is a continuation of application Ser. No. 08/430,309, filed Apr. 28, 1995 (now abandoned); which is a continuation of application Ser. No. 07/893,641, filed Jun. 5, 1992; which is a continuation-in-part of application Ser. No. 07/477,747, entitled "Miniature Hard Disc Drive System, filed Feb. 9, 1990 (now abandoned). Applications related to this application as a continuation, continuation-in-part, and/or divisional application through the common parent application Ser. No. 07/477,747 are as follows: application Ser. No. 08/484,682 which is a divisional of application Ser. No. 08/430,309, filed Apr. 28, 1995; which is a continuation of application Ser. No. 07/893,641, filed Jun. 5, 1992; which is a continuation-in-part of application Ser. No. 07/477,747, entitled "Miniature Hard Disc Drive System, filed Feb. 9, 1990. Application Ser. No. 08/486,932 is a divisional of Ser. No. 08/430,309 filed Apr. 28, 1995 (now abandoned); which is a continuation of Ser. No. 07/893,641 filed Jun. 5, 1992 (now abandoned); which is continuation-in-part of Ser. No. 07/477,747 filed Feb. 9, 1990 (now abandoned). Application Ser. No. 08/486,934 is a divisional of Ser No. 08/430,309 filed Apr. 28, 1995 (now abandoned); which is a continuation of Ser. No. 07/893,641 filed Jun. 5, 1992 (now abandoned); which is continuation-in-part of Ser. No. 07/477,747 filed Feb. 9, 1990 (now abandoned). Application Ser. No. 08/181,888 filed Jan. 14, 1994 is a continuation of Ser. No. 08/056,984 filed May 3, 1993 (now abandoned); which is a continuation of Ser. No. 07/932,922 filed Aug. 20, 1992 (now abandoned); which is a continuation of Ser. No. 07/807,793 filed Dec. 12, 1991 (now abandoned); which is a continuation of Ser. No. 07/477,747 filed Feb. 9, 1990 (now abandoned). Application Ser. No. 08/484,685 filed Jun. 7, 1995 is a divisional of Ser. No. 08/181,888 filed Jan. 14, 1994 and as otherwise described above.

The following applications assigned to the same assignee are incorporated herein by reference: patent application Ser. No. 07/613,263, entitled "Disc Drive Assembly"filed Nov. 9, 1990; U.S. Pat. No. 5,001,450, entitled "Position Detection for a Brushless DC Motor," issued Mar. 19, 1991; U.S. patent application Ser. No. 611, 300, entitled "Actuator Arm With Steel Sleeve for Thermal Off Track Compensation," filed Nov. 11, 1990; and patent application Ser. No. 611,189, entitled "Actuator Arm Assembly PCC to PCB Interface Assembly," filed Nov. 9, 1990. Also "Crash Stop and Magnetic Latch for Optimum Use of Disc Space", Ser. No. 07/893,764, filed Jun. 5, 1992, inventors I. Jabbari and S. Tafreshi; "Low Profile Disc Clamp", Ser. No. 07/893,490 filed Jun. 5, 1992, inventor S. Tafeshi, and "Disc Drive Spindle Motor", Ser. No. 07/893,484, filed Jun. 5, 1992, inventor I. Jabbari and M. Darling. Each of these last three are assigned to the assignee of this invention and are incorporated herein by reference.

FIELD OF THE INVENTION

The invention is directed generally to the field of hard disc drives, and more particularly to miniature Winchester-type hard disc drive systems having at least one disc of approximately 48 mm inch diameter or less.

BACKGROUND OF THE INVENTION

With the rapidly expanding development of personal computers into the field of first what was termed portable, then lap-top, notebook and now hand held size computers, there has been a tremendous demand for maintaining the performance of the disc drive systems of such small computers. The major development in this direction has been the development of smaller Winchester-type disc drives as replacements and enhancements to floppy disc drives for program and memory storage. The Winchester disc drive, in general, provides higher capacities and faster speeds of operation than floppy disc drives, factors which are of great importance for effective use of personal computers running advanced software packages.

The Winchester-type disc drives that have been developed for the personal computer market were initially based on the use of hard discs of a diameter of approximately 5.25 inches. Many of these disc drives used stepper motors for positioning a transducer over a selected track on the rotating disc, although larger capacity systems typically used voice coil motors. The next step in reducing the size of the disc drive was to cut the "form factor" (the dimensions of the external case for the complete disc drive) by one half, so that the resulting disc drive used a platter of 3.5 inch diameter. And most recently, disc drives having 2.5 inch diameter discs have become a common component of lap-top and notebook computers.

With the coming of notebook and hand held computers, the height of the disc drive was also becoming a significant factor, and efforts were made to reduce the height of the disc drive as well, so that the size of the casing for the computer could be minimized. However, as to most notebook computers, hard disc drives continue to be external devices.

It is a primary objective of the present invention to provide a compact hard disc drive system having reduced length, width and height dimensions that is compatible with notebook and hand held computer applications.

Another objective of the invention is to provide a compact hard disc drive system which may be inserted and removed from the computer, both to maximize the effectiveness of the disc drive and provide additional storage capacity by interchanging disc drives, as well as to provide security for the information stored on the disc drive.

A further objective of the present invention is to provide a disc drive which is compatible with the reduced power budget available in a battery-operated portable computer. Typically, portable computers only provide five volt DC power, which must be capable of providing sufficient power both to maintain the disc spinning at a constant speed, and powering the motor of the head arm actuator to selectively position the head over a track on the disc and maintain the head position over the target track on the disc.

Another object of the present invention is to utilize a voice coil motor design which is extremely compact yet capable of reliable positioning of the transducer supporting actuator arm relative to the disc on a long term basis.

Yet another objective of the invention is to provide quick connect/interconnect capability on the outer portions of the disc drive system to provide a simply-connected interface to the drive control electronics or host computer.

Yet another objective is to provide a small, low cost, but effective, magnetic latch and crash stop arrangement for limiting the motion of the actuator assembly used to position the transducers over the disc.

SUMMARY OF THE INVENTION

In summary, the compact Winchester-type disc drive of the present invention was specifically designed to provide a system which will meet the demands of notebook, lap-top and hand held size and type computer systems. In a preferred embodiment, the rotating disc diameter is approximately 48 mm and has a centrally located aperture of 12 mm diameter or less through which the spindle motor hub extends.

In the preferred embodiment of the present invention, a single hard disc will be provided as the storage medium, although a design having two or more hard discs is foreseeable. Storage capacity on each formatted disc exceeds 10 megabytes per disc surface. An actuator system supports two read/write heads for each disc, one head positioned on each side of an associated disc. A positioning mechanism is provided to move the transducer between tracks on the discs and for holding the transducer accurately positioned over each track.

In a preferred embodiment of the present invention, the actuator includes a rotary voice coil motor, which is arranged to move the transducer along a path extending in an approximately radial direction with respect to the hard disc to move the transducer selectively to any track on the available disc surface between the motor hub aperture (approximately 12 mm diameter) and the diameter of the disc (approximately 48 mm).

Additionally, means are provided for magnetically latching the heads comprising magnetic latch apparatus and a head rest area on the inner area of the disc in order to provide a very high resistance to physical shock during inoperative periods, e.g., a minimum 150 g of shock which simulates expected shock for portable lap-top and notebook applications.

By incorporating the features generally outlined above and to be described in further detail below, a single disc drive system having an overall outer dimension of about 70 mm by about 50 mm, with a thickness of less than 12.5 mm can be achieved for single disc systems and less than 15 mm for dual disc systems, wherein the disc diameter is approximately 48 mm. In this way, a highly compact disc drive system is achieved.

DETAILED DESCRIPTION OF THE PREFERRED EMBODIMENT

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
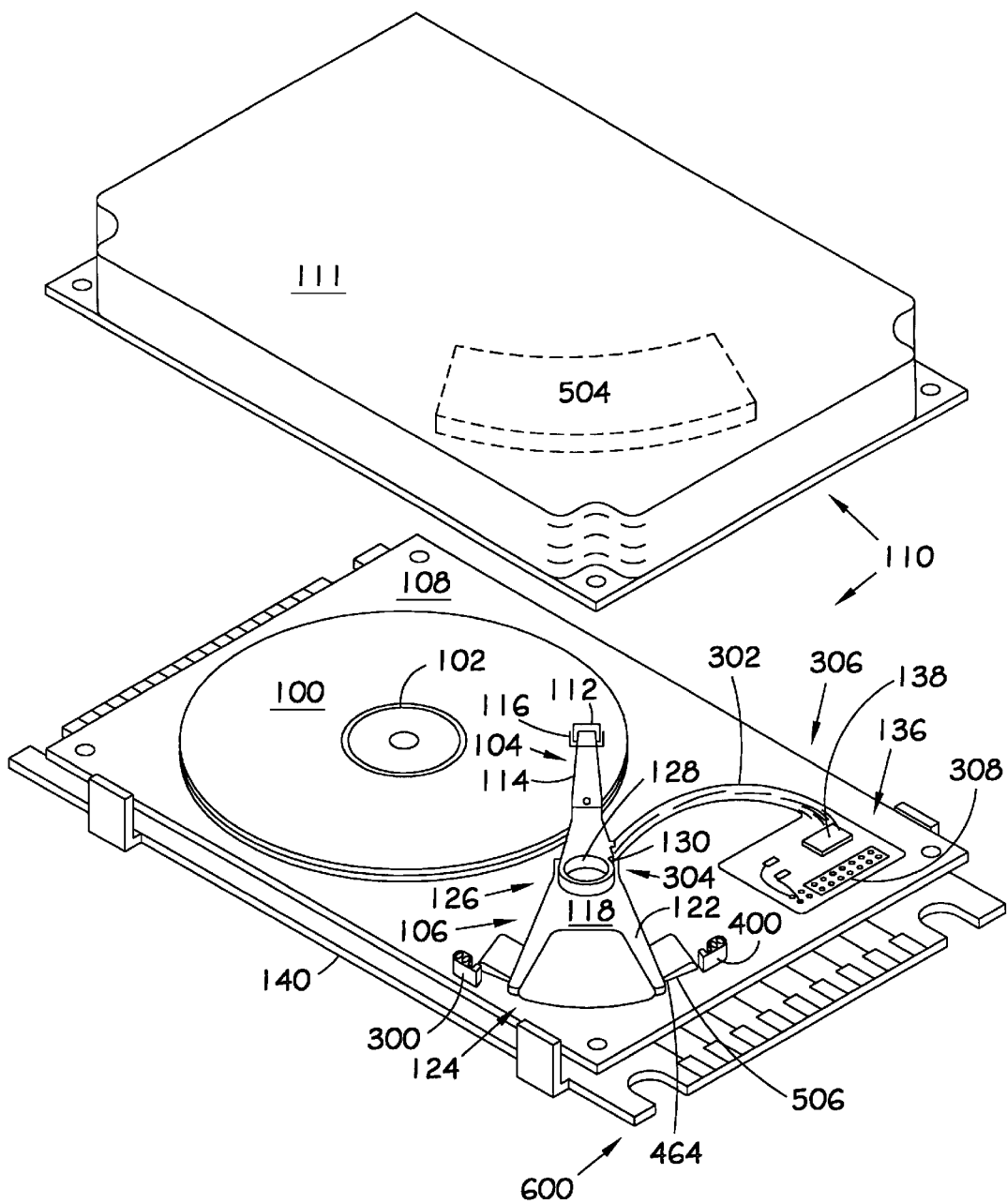
FIG. 1 is a isometric view of the preferred embodiment of the present invention.
Figure 2:
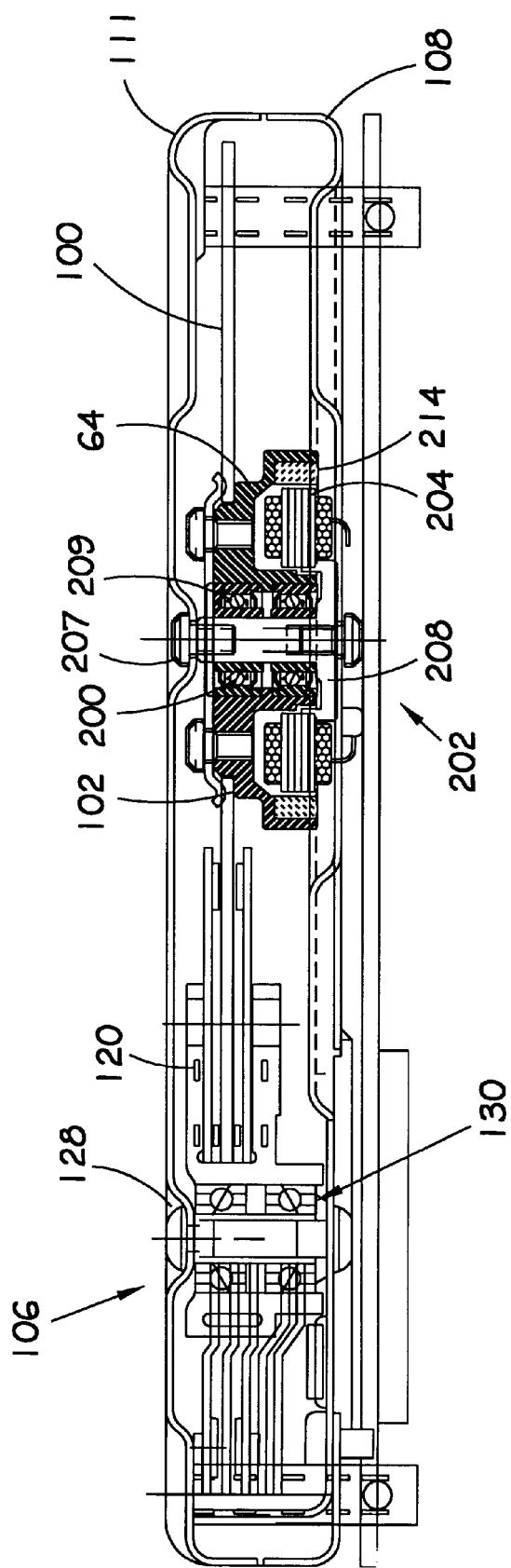
FIG. 2 is a cross-sectional view of the present invention pictured in FIG. 1 along a line through the brushless DC spindle motor and the pivot of the actuator assembly.

The miniature Winchester-type disc drive of the present invention is shown in an isometric view (with the cover shell removed) in FIG. 1 and in FIG. 2 from a vertical sectional view sectioned along a line through the spindle motor and actuator assembly axes of rotation. In each of the figures like components are designated by like reference numerals.

Referring to FIG. 1, the major elements of the miniature disc drive system of the present invention are shown, including hard disc 100, means for rotatably supporting the hard disc 102, means for rotating the hard disc (not shown), and an actuator assembly 106. These components are each mounted on a base portion 108 of a housing 110. A shell portion 111 forms a cover, and in conjunction with the base portion 108, encloses the aforementioned disc drive components.

The hard disc 100 preferably has a diameter of about 48 mm. A centrally located aperture through which the means for rotatably supporting the hard disc extends has a diameter of about 12 mm. Each disc 100 is preferably constructed from glass, aluminum, or canesite having a thickness of between 10 to 25 mils and is coated with a magnetic material. Once formatted each disc is capable of having more than 2000 tracks per inch of accessible storage space. This density of tracks enables a miniature disc drive to store more than 20 MB of data in a single disc system. Discs meeting these requirements are available from Yamaha, Fuji Corporation and Hitachi Corporation, all of Japan.

The disc explained herein utilizes one or more magnetic material coated discs; however, the disc drive may utilize various numbers and types of discs. For example, optical discs and associated laser technology based read/write heads could be used and the concepts and principles embodied in this invention would be fulfilled.

Figure 3:
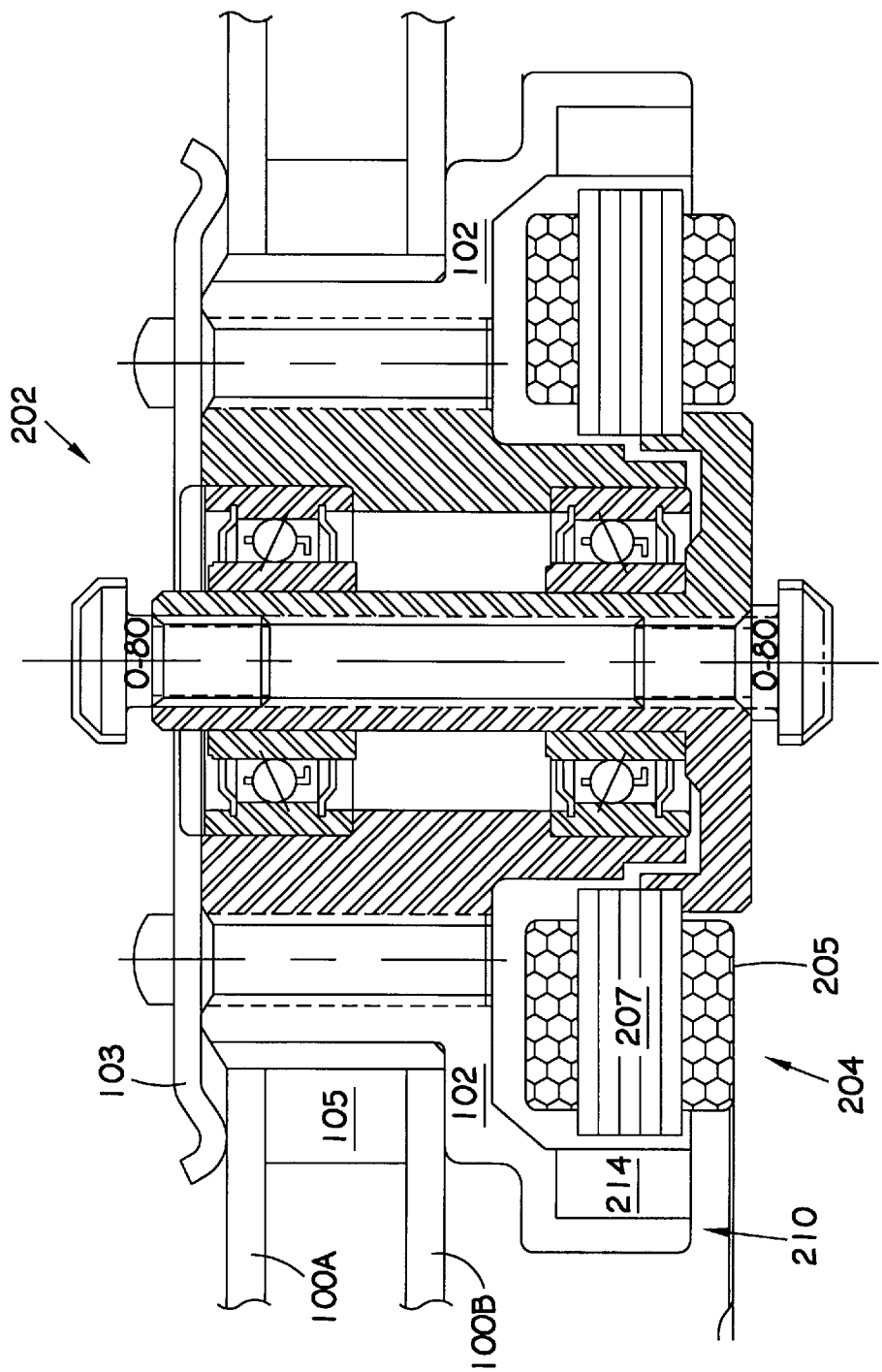
FIG. 3 is a cross-sectional view of an alternative brushless DC motor for rotating two discs.

The means for rotatably supporting the hard disc 100 is a hub 102 which is an integral part of the rotor of a brushless DC motor 202. In the preferred embodiment of the present invention and as depicted in FIG. 2, one concentrically aligned disc 100 is positioned on the hub 102. The disc is maintained in this orientation by a hold down or clamping assembly 200. The disc drive system depicted is a single disc system; however, to increase storage capacity, multi-disc systems are foreseeable. For example, FIG. 3 depicts a dual disc arrangement having the discs 100A, 100B stacked on the hub 102 in a parallel spaced relation. The discs are maintained in this orientation by a clamping assembly 103 and a spacer 105 between the discs 100, 100B.

Figure 4:
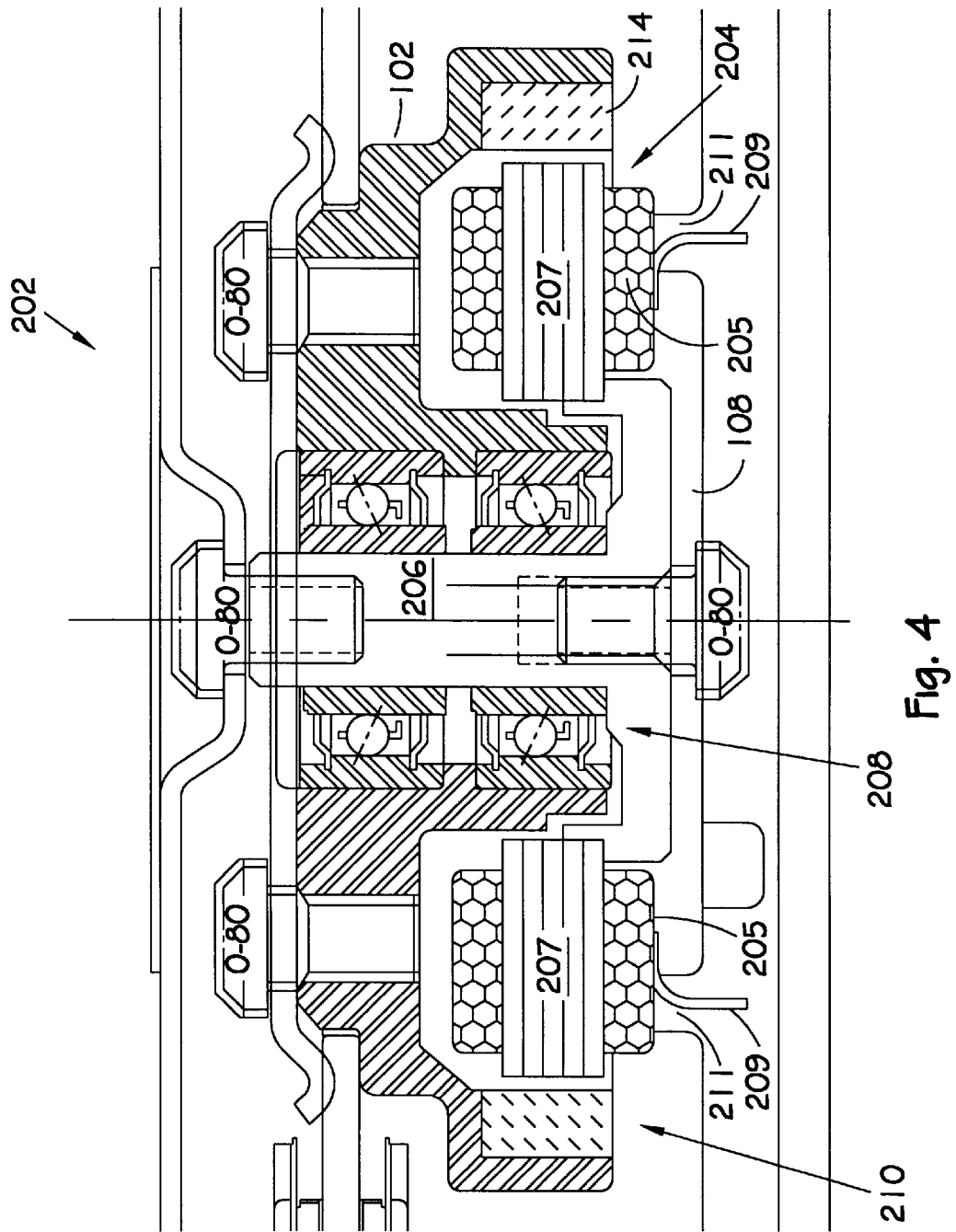
FIG. 4 is a depiction of the preferred embodiment brushless DC spindle motor having a single disc mounted thereto.

As depicted in FIG. 2 and more clearly depicted in FIG. 4, the means for rotating the hard disc 100 is preferably a brushless DC motor 202 having an integral hub 102. Alternatively, as depicted in FIG. 3, the brushless DC motor 202 having a hub capable of supporting two discs is used. The motor 202 includes a stator 204 having about 100 turns of 4 mil thick copper wire 205 on each pole 207 which is fixedly mounted to a shaft 206 forming the axis of rotation for the motor 202. Note that the stator 204 is positioned slightly below the portion of the hub 102 to which the disc 100 is mounted. This arrangement enables a stator 204 having enough current handling capability to establish significant motor torque, while maintaining a hub diameter of only 12 mm. In fact, a motor having this design uses the same or less amount of running current as do the motors used in the previous generation disc drives, i.e., a typical 2.5 inch drive.

Bearing means 208 are journalled about the shaft and support a rotor 210 comprised of the hub 102 and a multi-pole ring-shaped permanent magnet 214 (preferably neodinium) positioned on the inner surface of the hub 102 facing the stator 204. The bearings are mounted with a spacing of 2.5–3.5 mm. Bearings which are small enough for this application are available from NMB of Japan. The small size of the bearings 208 require very little preload force be applied during manufacture, thus extending the life of the motor 202.

As is typical in brushless DC motor operation, the interaction of a magnetic field generated by the stator 204 with the rotor permanent magnets 214 propels the rotor 210 about the stator 204. The rotor 210, having the hub 102 as an integral component, rotates the hard disc 100. One factor which reduces the required start-up torque is the fact that the transducers 112 for this small application are reduced in size and impart only about a 5 gram load upon the disc 100 when the transducers 112 are at rest.

In keeping with one aspect of the invention, the motor shaft 206 is mounted at one end to the base portion 108 of the housing 110 and at the other end to the shell portion 111 of the housing 110, or the top screw can be omitted and the shaft will have an interference fit with the shell. This arrangement forms a compact assembly minimizing the cross-sectional height of the disc drive system. Moreover, the dual end support of the shaft provides exceptional stability and ruggedness necessary for a portable disc drive.

Additionally, to reduce height and improve manufacturability, the stator winding conductors 205 are accessible via four conductive pins 209 that protrude from the motor 202 through slots 211 in the base portion 108. A printed circuit cable (PCC) is attached to the conductive pins 209 at one end and the other end is connected to the input/output connector 136 to provide commutation energy to the windings 205. A similar arrangement is disclosed by Jabbari et al. in patent application Ser. No. 07/613,263, entitled "Disc Drive Assembly" filed Nov. 9, 1990 and incorporated herein by reference.

Alternatively, the conventional ball bearings are replaced with jewel bearings preferably constructed from sapphire crystals. The jewel bearings provide the same advantageous dual end support of the shaft as described above. However, the addition of the jewel bearings provide superior ruggedness. Where ball bearings are prone to permanent deformation after experiencing extreme mechanical shock, jewel bearings are not.

Figure 5:
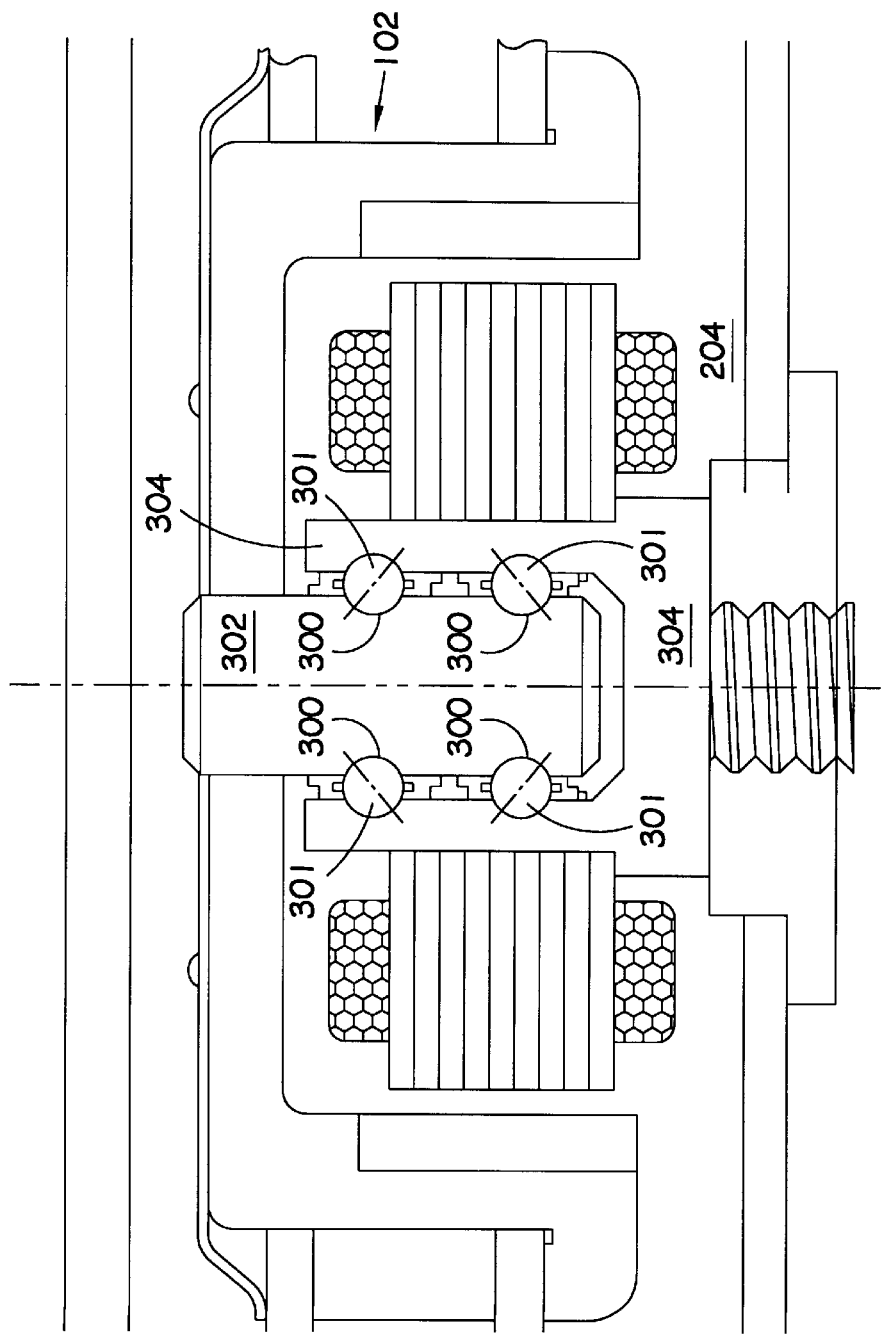
FIG. 5 is a cross-sectional view of another alternative brushless DC motor for rotating two discs and having an alternative, raceless motor bearing arrangement.

In an effort to reduce the diameter of the spindle motor 202 an even greater degree than described above, an alternative bearing design may be used. As shown in FIG. 5, the inner 207 and outer 209 bearing races are eliminated from the design and the balls 301 (steel or jewel) ride in a groove 300 in both the shaft 302 and a bearing tube 304. Use of raceless bearing systems is well known in the art of electric motor design. However, current manufacturing constraints, namely the tool which moves the shaft aside and inserts the balls, limit the use of raceless bearings to the dual disc motor shown in FIG. 5. Therein the bearings are spaced 5 mm apart which is compatible with the 4 mm spacing necessary for the manufacturing tool to fit. It is foreseeable that advances in manufacturing techniques will permit the raceless bearing arrangement to be installed in the single disc drive motor. As shown in FIG. 5, using the raceless design permits the stator 204 to be moved into the hub 102 and creates a motor with a smaller height than the motor using conventional bearings shown in FIG. 3. Note that the embodiment depicted in FIG. 5 has a rotary shaft. It is foreseeable that the motor of FIG. 2 or 3 having a stationary shaft can be adapted to use raceless bearings as well.

In either type of brushless DC motor, motor position detection circuitry is necessary to ensure quick and properly directed motor rotation. Typically, Hall devices are used to detect the rotor position at start-up. However, in miniature disc drives where space efficiency is critical, electronic methods such as those disclosed in U.S. Pat. No. 5,001,450, issued Mar. 19, 1991, herein incorporated by reference, are applicable. In general, the position detection system injects two short current pulses having opposite polarities into each phase winding of the motor and senses the sign of the differences in the induced voltages resulting from each pulse. The polarity (sign) of these differences is indicative of the rotor position. The position location system can be used for both determining the initial phases to be driven to start the motor in the correct direction and for controlling the speed of the motor while it is running.

Referring to FIG. 1, an actuator assembly 106 including a transducer means 104 at one end and a transducer positioning means 124 at the other end is depicted. Generally, the transducer means 104 includes magnetic transducers 112 as well as mounting hardware for attaching the transducers 112 to an actuator arm 118. The transducer positioning means 124 is typically a voice coil motor 124 having the motional element attached to the actuator arm 118 which causes the actuator arm 118 to pivot and position the transducers 112 over the disc surface to read and write data to the recording media 100. Typically, one transducer 112 is positioned over each of the two disc surfaces.

Conventionally, the transducers 112 are magnetic elements attached to a flexure 114 via a slider 116. When the hard discs 100 are spinning at full speed, the transducers 112 fly above each disc surface on a cushion of air, known in the art as an air bearing. The flexure 114 biases the transducers 112 toward the disc surface and provides a gimballing action which enables the transducers 112 to fly parallel to the disc surface such that only a small gap exists between the transducer 112 and the disc surface 100. At a small distance each transducer 112 can read or write data to the disc.

In the preferred embodiment, the transducers are conventional thin film magnetic heads having a general design which is well known in the art. Alternatively, the transducers are constructed from magneto-resistive materials such as is disclosed in U.S. Pat. No. 4,891,725, issued Jan. 2, 1990. Each head of either design is attached to a slider 116 which is attached to the flexure 114.

Figure 6:
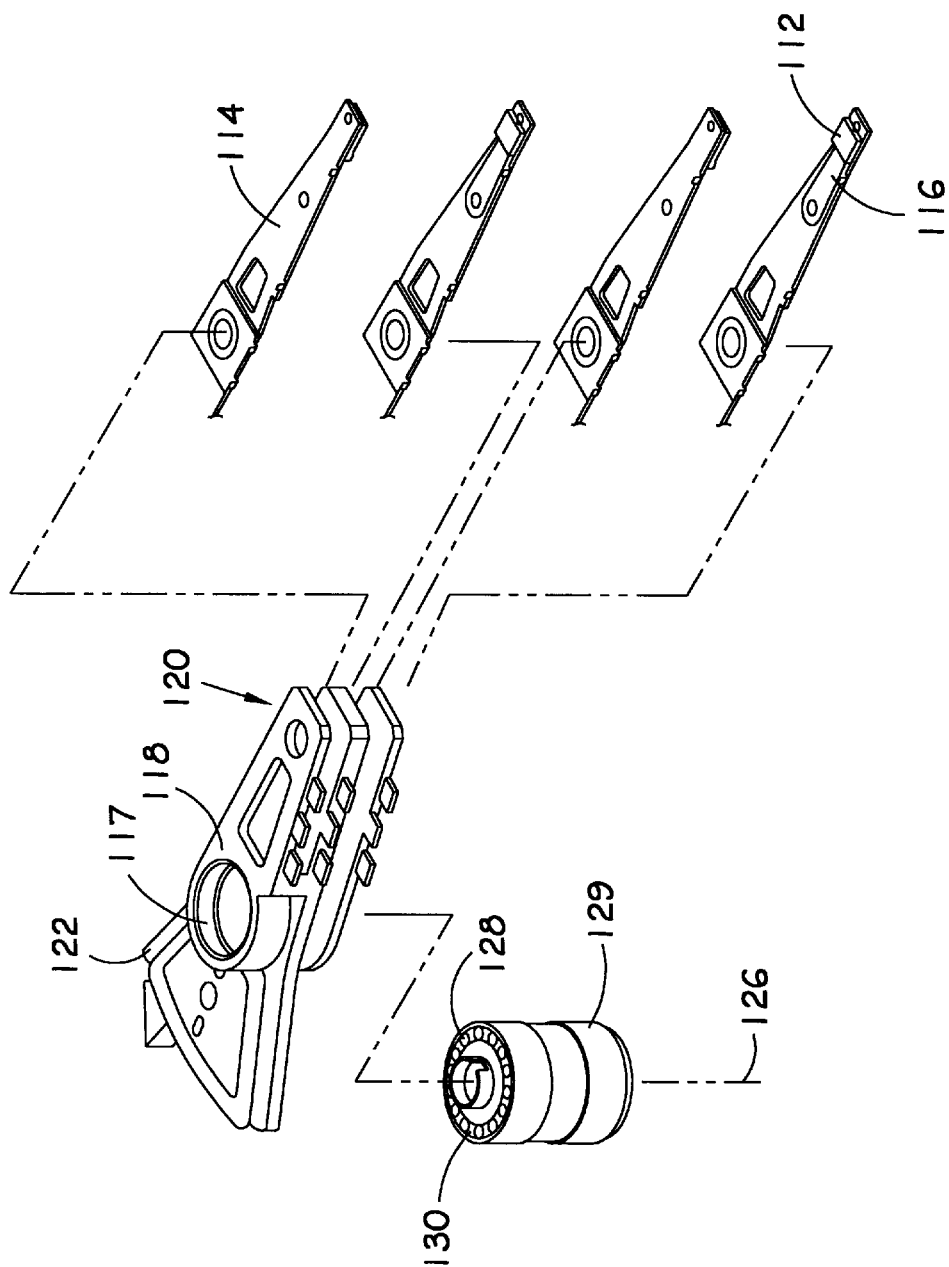
FIG. 6 is an exploded, isometric view of the actuator assembly used in the two disc system in accordance with the present invention.

As depicted in the exploded isometric view of FIG. 6, the transducers 112 are attached to flexure 116 of conventional design used in 3.5 inch disc drives, but having reduced dimensions which are approximately 50 percent smaller than the conventional flexure designs, e.g., Type 13. The flexure 114, head 112, slider 116 combination establishes about a 5.0 gram load upon the disc 100 while the disc 100 is at rest.

Figure 7:
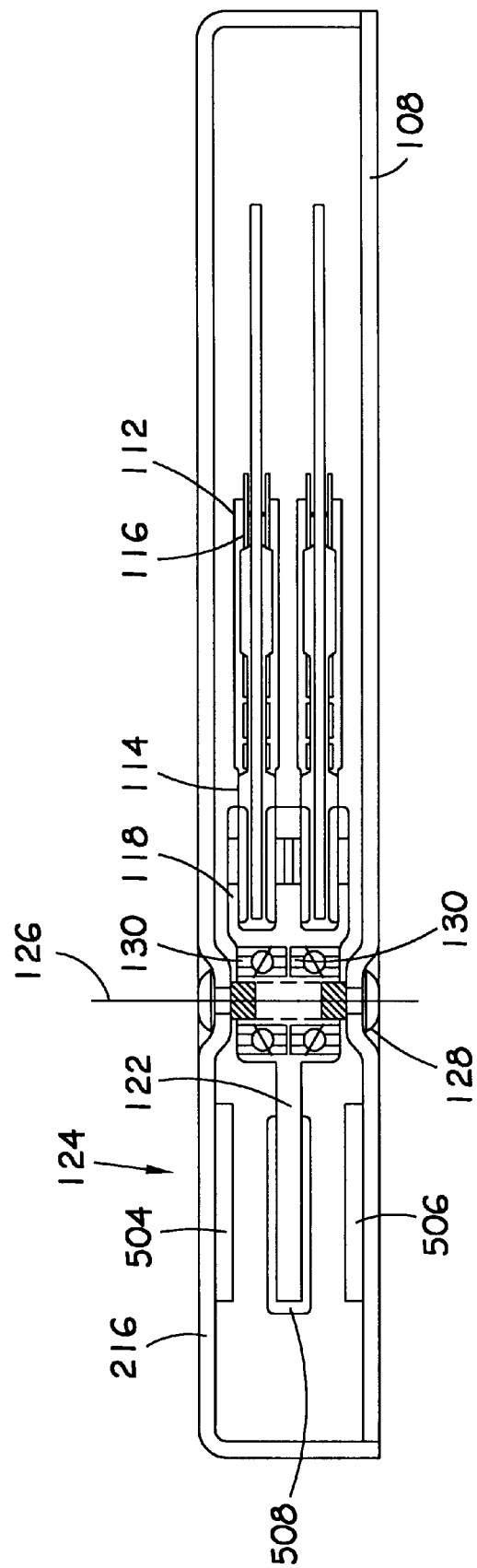
FIG. 7 depicts a moving coil actuator assembly in cross-section.

As depicted in FIGS. 6 and 7, the flexures 114 are attached at one end to an actuator arm 118. As depicted, the actuator arm 118 has a first end 120 to which the flexure is attached and a second end 122 to which a portion of a voice coil motor 124 is attached. Alternatively, the flexure could be welded to mounting plates which are stacked together to effectively make an actuator arm assembly. In the preferred embodiment depicted in FIGS. 1 and 2, the first end 120 holds two flexure/slider/transducer combinations which extend over both surfaces of the disc 100. Alternatively, as depicted in FIG. 6, in a two disc system, four flexure/slider/transducer combinations are provided. Centrally located along the actuator arm is a pivot 126 comprising a steel shaft 128 journalled by a bearing assembly 130 that enables the actuator arm 118 to rotate about the pivot 126. To facilitate improved thermal off track compensation and reduced bearing pre-load, a steel sleeve 129 is positioned between the pivot bore 117 defined by the actuator arm 118 and the bearing means 130 as disclosed in U.S. patent application Ser. No. 611, 300, filed Nov. 11, 1990, assigned to the assignee of the present invention and herein included by reference. In general, this form of assembly is in accordance with the teachings of Gitzendanner, U.S. Pat. No. 4,620,261, assigned to the assignee of the present invention.

Figure 8:
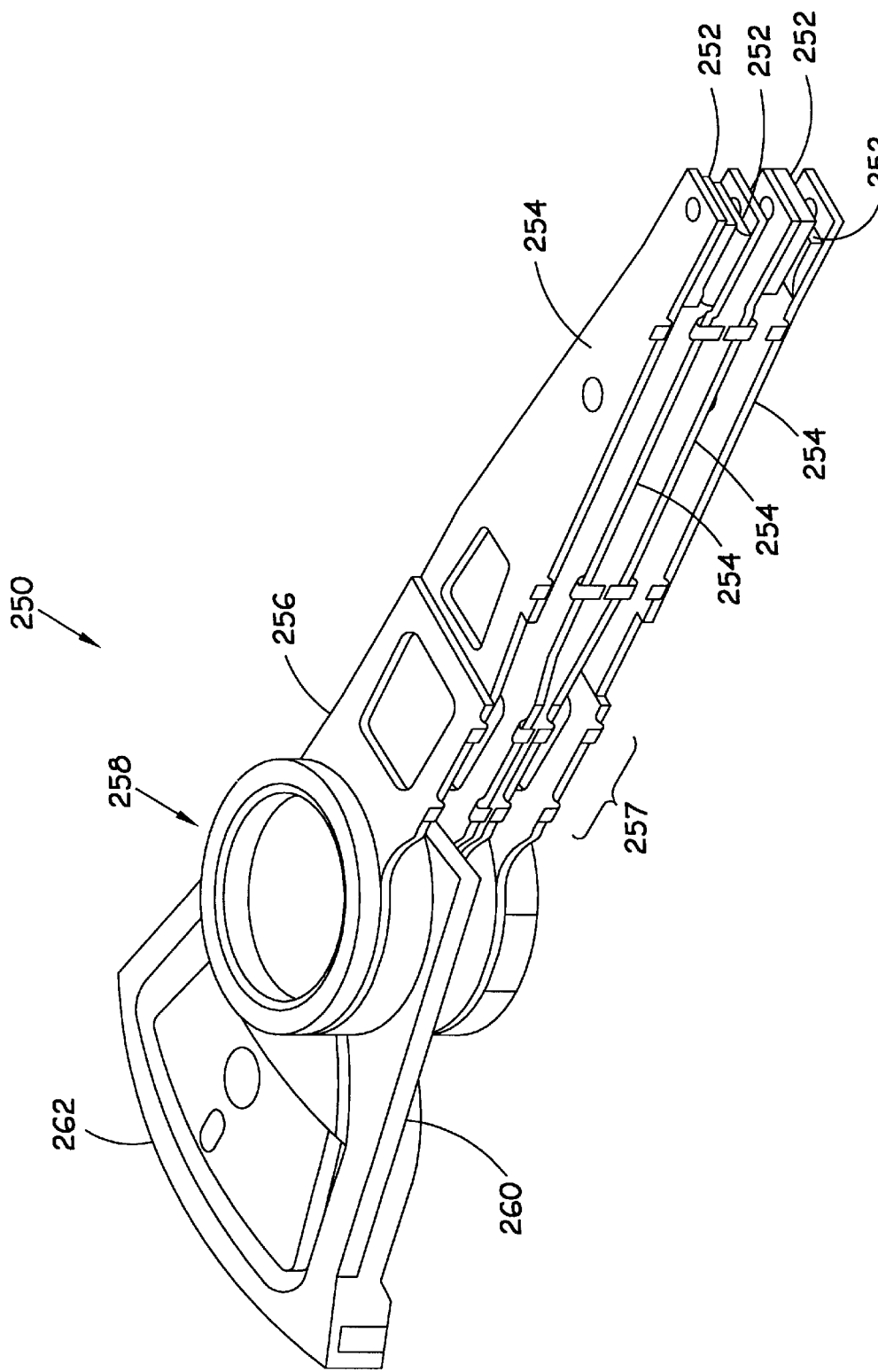
FIG. 8 is an alternative disc drive head positioning assembly.

FIG. 8 is an isometric view of an alternative head positioning assembly. Head positioning assembly 250 is shown having a plurality of magnetic heads 252 affixed to flexures 254. The flexures 254 have an end distal from magnetic heads 252 which overlap a ring mounting structure 254 at area 257. Ring mount structure 256 in turn in journaled about a hub assembly 258. Also connected to hub assembly 258 are supported brackets 260 for voice coil 262 which operate in conjunction with a magnetic circuit (not shown) which serves to move the magnetic heads 252 across the information storage disc. The flexure 254, ring mount 256 and hub assembly 259 are all constructed of a common steel alloy. Ring 256 is also of common steel content and is shaped so as to circumscribe the spindle hub assembly 258. Mounting ring 256 and flexure 254 may be welded together without the use of a mounting plate connecting the arm member to the flexure, since both are of steel composition. The particular technique utilized for welding one embodiment of the present invention was six spot welds. Details of the flexure are disclosed in U.S. application Ser. No. 07/835, 168, filed Feb. 13, 1992, entitled "Disc Drive Having Oppositely Stacked Actuator Arm and Spindle Disc Stacks", inventors Iraj Jabbari and Thomas Hickox (Attorney Docket No. SEA 2218) incorporated herein by reference.

Figure 9:
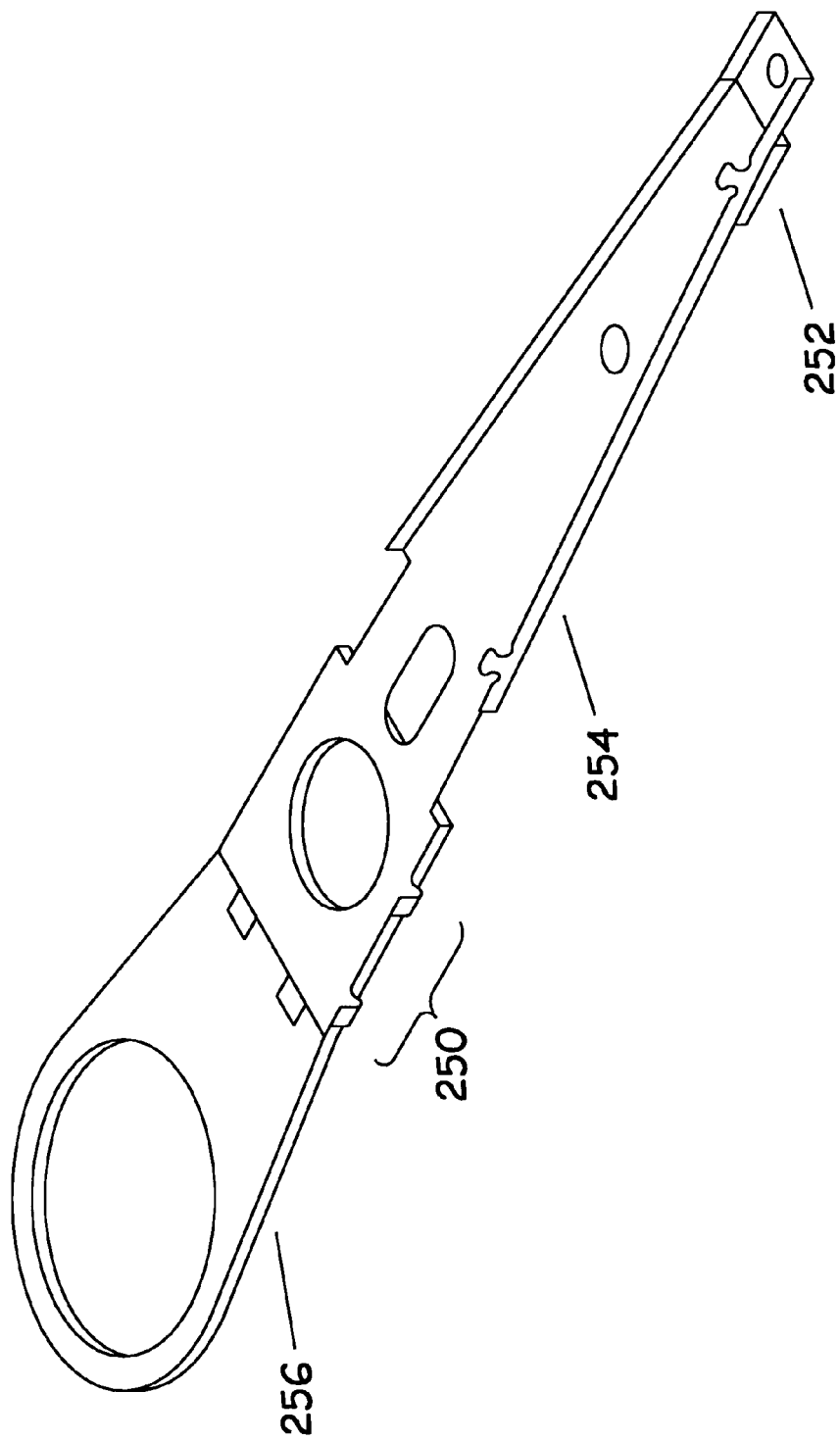
FIG. 9 is an isometric view of a single mounting ring attached to a flexure and a magnetic head as used in the assembly of FIG. 8.

FIG. 9 shows a single ring mount 256 affixed to flexure arm 254 and magnetic head 252. The circular formation at the end opposite the magnetic head 252 is designed in such a manner as to circumscribe the spindle hub assembly 258.

Figure 10:
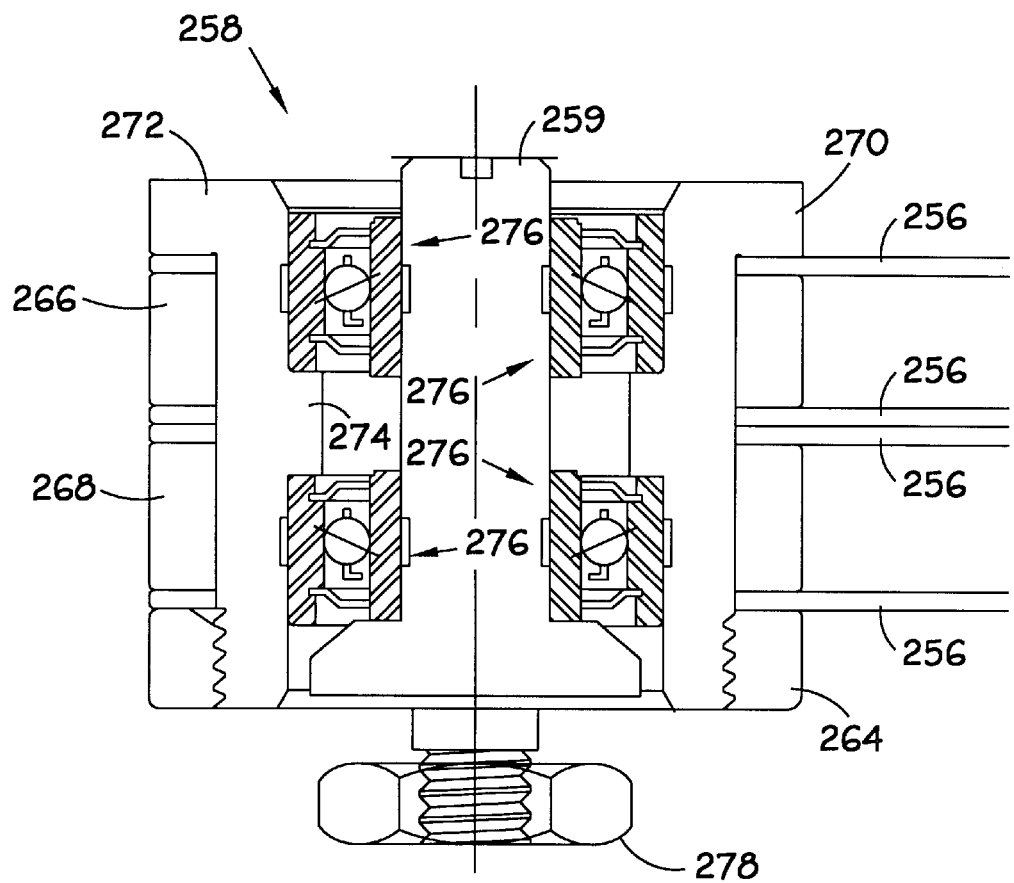
FIG. 10 is a cross-sectional view of one embodiment of the central hub member used in the assembly of FIG. 8.

FIG. 10 is a cross-sectional view of spindle hub assembly 254. The inside diameter of hub 262 may accommodate race and bearings 276 for supporting and accommodating rotation of the hub assembly 258 about a fixed shaft 259. Locking nut 264 is tightened in such a manner as to permanently engage hub assembly 258 with the respective mounting rings 256. Disposed between the upper mounting ring 256 and the center two mounting rings 256 is a spacer 266. In the embodiment shown, the spacer 266 is attached to the voice coil support 260. However, the two elements can conceivably be separate components. Additionally, between the center two mounting rings 256 and the lower mounting ring 256 is a second spacer 268. The stack of spacers 266, 268 and mounting rings 256 are held in place by a compressive force between the nut 264 and the flange 270 of hub 272.

Hub 272 also includes, on its inner surface, a bearing separator element 274. The bearing assemblies 276 are affixed to the shaft 259 and hub 272 by epoxy. The actuator assembly 250 is fixed to the disc drive chassis by nut 278.

Thus, by utilizing the alternative actuator assembly implementation taught by the foregoing description, the spacing between information storage discs and the corresponding drive dimensions may be greatly reduced relative to current manufacturing practices by elimination of the mounting plate.

The invention as depicted in FIG. 1 incorporates a special manufacturing feature embodied in the location of the pivot 126 and the arrangement of components within the disc drive housing 110. In accordance with this aspect of the invention, enough space is provided within the housing 110 to enable the actuator arm 118 to be pivoted such that the transducers 112 are no longer on the disc 100. To accomplish this only a crash stop 300 must be disassembled by removing a single screw. The extra pivotal distance permits the disc 100 to be removed and replaced if damaged without disassembling the entire disc drive. This feature is a significant improvement over the prior art as an aid to manufacturing, testing, and after market repair.

Figure 11:
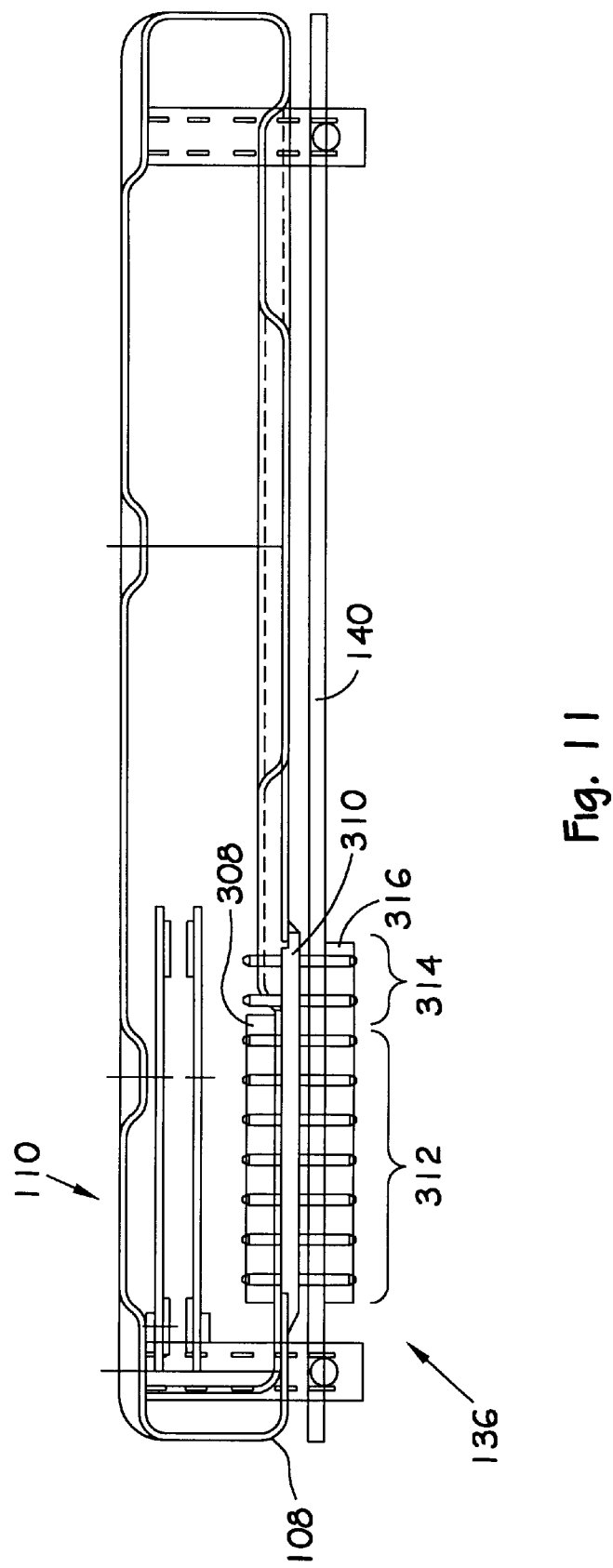
FIG. 11 depicts a cross-sectional view of the connector arrangement used to connect the internal circuitry to the external control circuitry.

Signals from and to the transducers 112 as well as power for the voice coil motor 124 (when necessary) are transferred to those components via a printed circuit cable (PCC) 302. This interface is substantially similar in design to that which is disclosed in patent application Ser. No. 611,189, filed Nov. 9, 1990, entitled "Actuator Arm Assembly PCC to PCB Interface Assembly." Significant aspects of this design are shown in FIG. 11 herein. The PCC 302 connects to the actuator arm 118 at one end 304 and forms a printed circuit board PCB 306 at the other end. The PCB contains an amplifier integrated circuit 138 which amplifies the signals from the transducers 112. The amplified signals, the write data, spindle motor commutation signals and the VCM control signals pass from this PCB 138 to a main PCB 140 outside of the housing 110 via a sixteen-pin connector arrangement 136. The input-output signal traces on the PCB 138 connect directly to a female connector 308 that connects to twelve pins 312 of the sixteen-pin element 310 which is epoxied into an aperture in the base portion 108 of the housing 110. The remaining four pins 314 are connected via a PCC to the spindle motor 202. The connector arrangement 136 depicted in cross sectional form in FIG. 8 maintains the integrity of the clean room environment within the disc drive housing 110 during manufacturing and testing of the system via the eighteen pin connector 310. The main PCB 140 is connected on the outside of the housing 110 to the sixteen-pin element 310 via a detachable female connector 316 similar to the connector 308 used on the inside of the housing 110.

Figure 12:
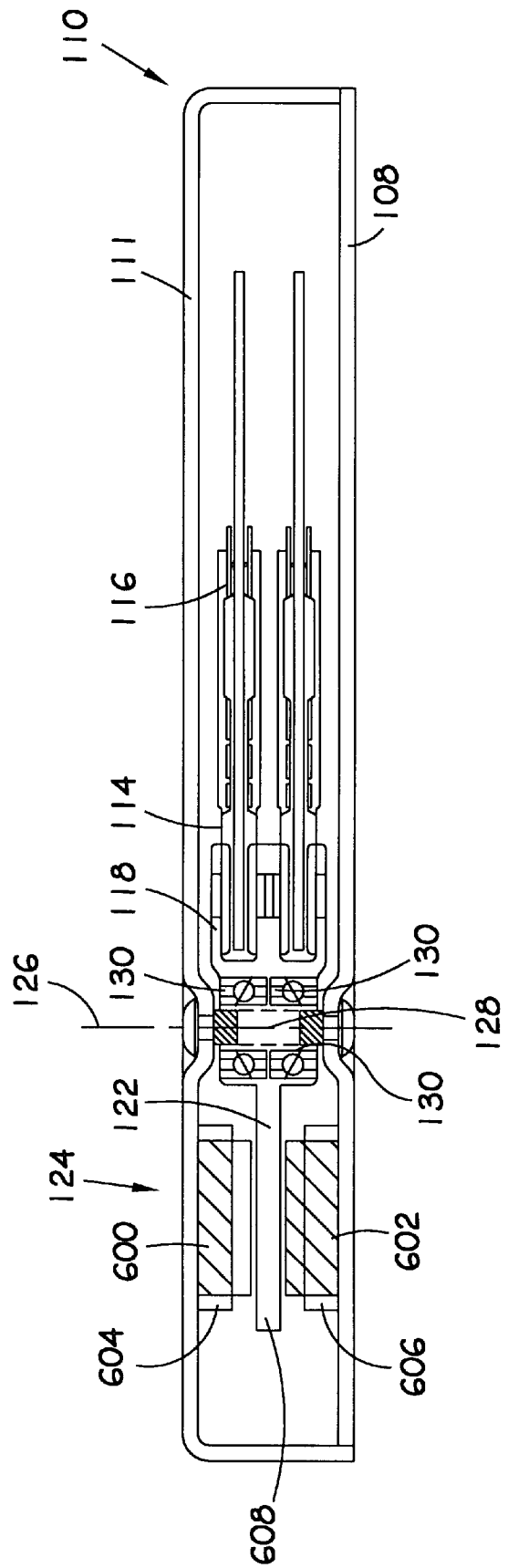
FIG. 12 depicts a moving magnet actuator assembly in cross-section.

As depicted in FIGS. 2, 7, and 12 and in accordance with one aspect of the present invention, the shaft 128 of the actuator assembly 106 is supported at one end by the shell 111 of the housing 110 and at the other end by the base 108 of the housing 110. This arrangement provides exceptionally rugged actuator support. Alternatively, the shaft 128 could be supported by a single fastener at one end of the shaft which sacrifices ruggedness for a lower parts count.

Optionally, the conventional ball bearings depicted in the bearing assemblies 130 may be replaced with jewel bearings, preferably made of sapphire. This arrangement also provides the rugged two point actuator arm support discussed above as well as the superior shock resistance of the jewel bearings. In either arrangement, the shaft 128 is supported such that the actuator arm may quickly and reliably alter the position of the transducers 112 relative to the data tracks on the hard disc 100.

Referring to FIG. 1, located at the second end 122 of the actuator arm 118 is a voice coil motor 124 for providing the torque to position the transducers 112. As shown in FIG. 7, the voice coil motor 124 includes a single permanent magnet 504 attached to the bottom base plate. In some designs, more than one permanent magnet may be used. In the preferred embodiment of the motor 124 shown in FIG. 7, the magnet 506 is attached to the base 108 of the housing 110. The bottom magnet is glued to the bottom pole piece; the top pole is welded to the top cover. The second end 122 of the actuator arm 118 passes through the gap formed between the magnets 504, 506 and carries a voice coil 508. Controlled application of current to the voice coil 508 moves the coil relative to the magnets 504, 506, thus moving the transducers 112 relative to the disc surface 100. An alternative design utilizes only a single magnet attached to either housing component.

Another alternative voice coil motor 124 depicted in FIG. 12 has one or more iron cores 600, 602 each wrapped with a coil 604, 606 mounted to the shell 111 and the base 108 of the housing 110 in the same confrontational orientation as the previously described moving coil motor (FIG. 7). A permanent magnet 608 is attached to the second end 122 of the actuator arm 118. Controlled application of current to the coils 604, 606 wrapped about the cores 600, 602 causes rotation of the actuator arm 118 about pivot 126.

In each of the previous motor designs, the disc drive housing 110 may form the back iron which completes the magnetic circuit necessary for the motor 124 to operate properly. In this situation, the housing 110 must be constructed from a magnetically permeable material. The flux leakage away from the voice coil motor area must be strictly controlled, i.e., no more than 30 Gauss near the discs, or the magnetically recorded data on the discs will become corrupted and unreadable. In addition, the leakage fields near the heads must be less than 5 Gauss or the read/write function will be compromised. To meet the strict flux leakage requirements the thickness of the magnets 404, 406 and cores 300, 302 attached to the housing 110 are maintained at approximately 1.5 mm.

Figure 13:
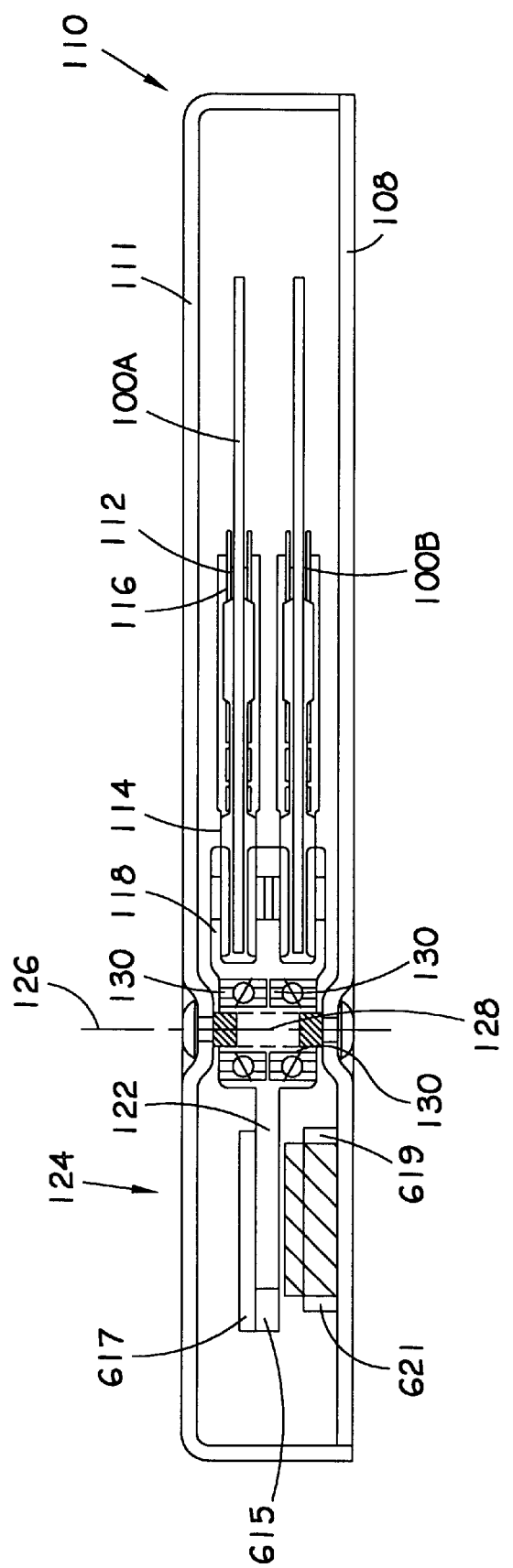
FIG. 13 depicts the an alternative embodiment of the moving magnet actuator of FIG. 12 having a moving back iron.

As depicted in FIG. 13, another alternative voice coil motor has a moving magnet and back iron assembly as disclosed in U.S. patent application Ser. No. 541,845, filed Jun. 21, 1990, herein incorporated by reference and assigned to the assignee of the present invention. In general, a permanent magnet 615 and a back iron 617 combination are attached to the second end 122 of the actuator arm 118. A single or dual coil and core arrangement 619, 621 is positioned facing the magnet 615. The back iron 617 being on the opposite side of the magnet 615 from the coils 619. The core 621 and coils 619 are mounted to either the shell 216 or the base 108 of the housing 110. FIG. 13 depicts the core/coil arrangement 619, 621 being attached to the base 108 of the housing 110. Selective current application to the coils 619 propels the magnet 615 and back iron 617 arrangement and moves the actuator arm 118.

The actuator assembly 106, no matter what type of voice coil motor 124 is used, is statically balanced about the pivot point 126 to provide shock resistance. A balanced actuator, when jarred laterally, will not move about the pivot 126 to any substantial degree. Thus, transducer damage as a result of lateral impact will not result. Moreover, tracking errors caused by physical impacts during operation are mitigated by a balanced actuator assembly 106.

It is important to note that in order to maximize the ability of the disc drive system to handle shocks in excess of 150 g's for portable applications, the system is designed to provide a latch means by resting the transducers 112 on the disc surface near the hub 102 when the disc drive is inoperative. To maintain the parked position during rough handling, a magnetic latch 400 is provided to supplement the relatively small 5.0 gram load generated by the heads 112 upon the disc. The latch 400 is positioned to halt the pivotal motion of the actuator assembly 106 as the transducers 112 move toward the center hub 102. In this sense, the latch 400 acts as a crash stop to ensure that the transducers 112 do not impact the hub 102. In fact, a second element 300 similar to the latch element 400 is used as a crash stop to ensure that the transducers 112 do not swing off the disc 100 during operation of the drive.

Figure 14A:
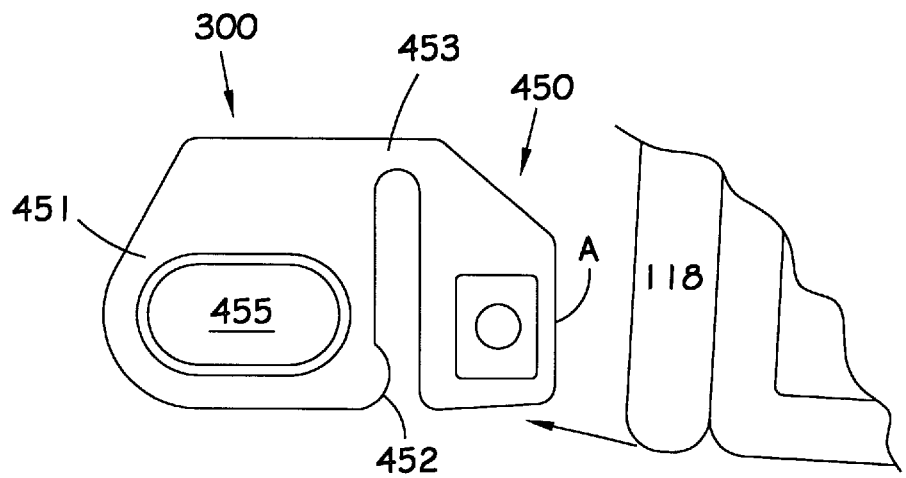
FIGS. 14A through 14C depicts the operation of the crash stop when impacted by the actuator assembly.
Figure 14B:
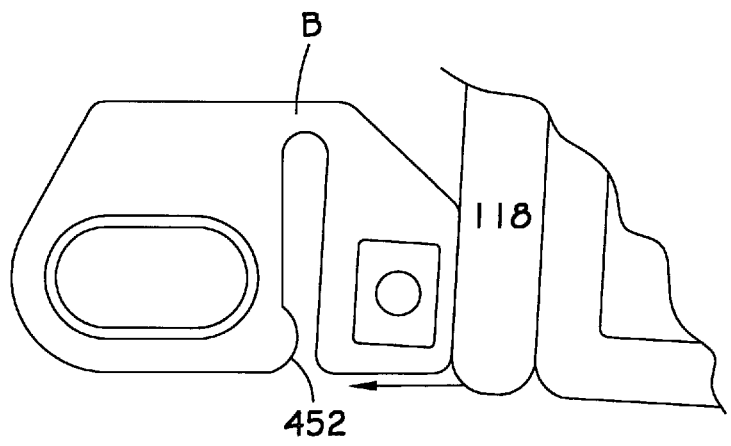
Figure 14C:
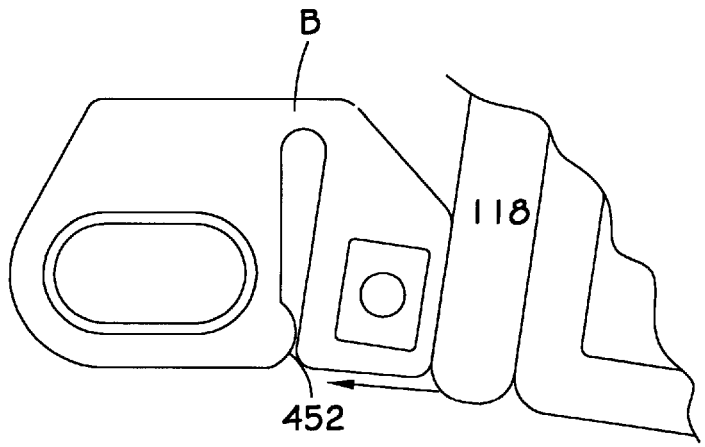

The crash stop operation of both elements 300, 400 provides a means for stopping the actuator arm 118 in a gradual fashion, i.e., without sudden impact with an inelastic crash stop. The elements 300, 400 are constructed from a flexible plastic material such as ester-based polyurethane. However, other materials may function just as well. As depicted in FIGS. 14A through 14C the crash stop 300 is comprised of an extended portion 450 attached to a fixed portion 451 by a thin connecting portion 453. The fixed portion is attached to the base portion 108 of the housing 110 by a screw 455. The crash stop 300 is designed to have a stepped elasticity beginning when the arm 118 impacts the crash stop 300 at point A. Initially, as shown in FIG. 14B, the extended portion 450 of the crash stop element 300 pivots by flexing the connecting portion 453 at point B to slow the speed of the arm 118. As shown in FIG. 14C, lastly, the extended portion 450 impacts a protrusion 452 which reduces the spring constant of the extended portion 452 to essentially the compressivity of the plastic material and quickly slows the arm's motion to a stop. This two step process, reduces the potential harm to the actuator assembly which can result from using a fixed, sold crash stop. Subsequent to the final step, the extended portion 450 returns to the undeformed position shown in FIG. 14A.

Prior art forms of crash stops have relied upon a rubber coating to cushion the impact of the actuator arm upon the crash stop. However, rubber causes stiction which can hold the arm after impact such that the voice coil motor can not recover the arm's mobility. This is a major problem in miniature disc drives having VCM's with reduced torque.

The invention, using a relatively hard plastic maintains the cushioning effect of rubber, but avoids the stiction problem.

Figure 15A:
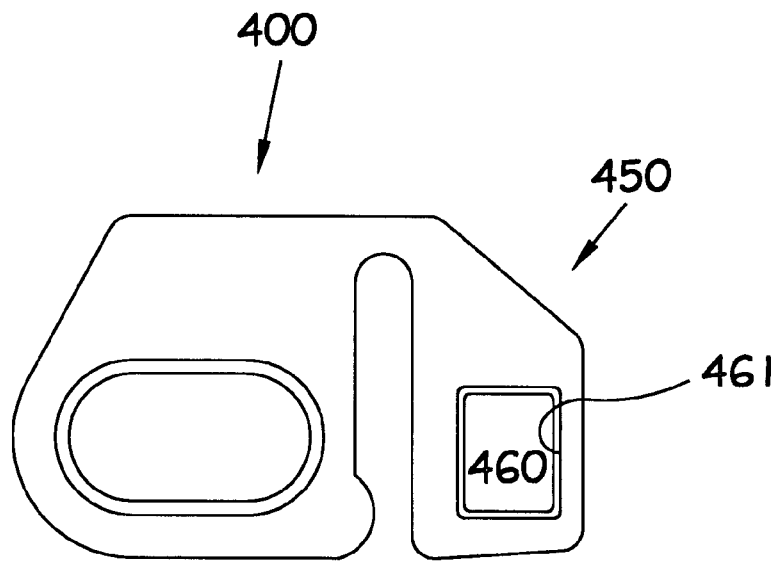
FIGS. 15A and 15B show the magnetic latch in a plan view and a cross-sectional view.
Figure 15B:
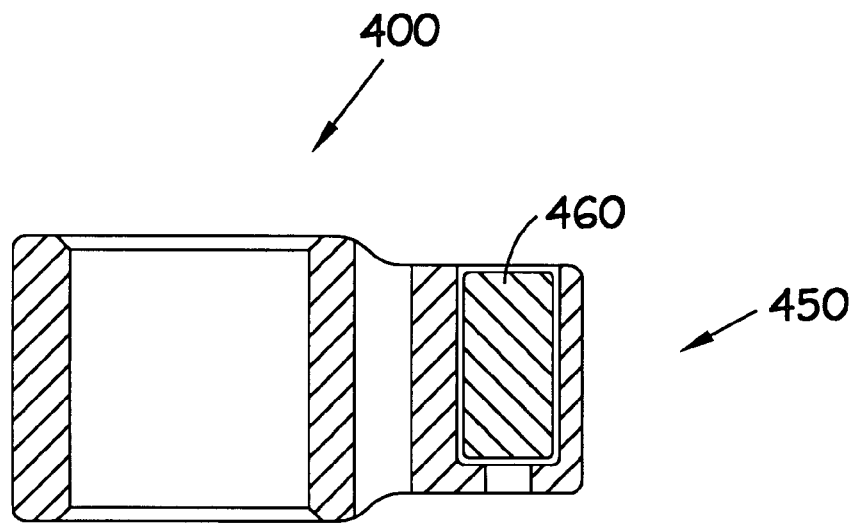

As depicted in FIGS. 15 A and B, to form a magnetic latch 400 using the crash stop element described above, a magnet 460 is placed within an aperture 461 in the extended portion 450 of the crash stop element. A ferrous metal striker 464 shown in FIG. 1 is positioned upon the actuator arm 118 such that the striker 464 impacts the extended portion 450 having the magnet 460. The attractive magnetic force of the magnet 460 will couple to the metal striker 464 and hold the striker against the latch 400, thus maintaining the arm's position. The disc drive power can safely be discontinued and the transducers 112 will come to rest upon the inner surface of the disc 100 allocated as the transducer resting area. The combination of the magnetic latch 400 and the transducer load upon the disc 100, i.e., approximately 2.5 grams, will reduce the lateral motion of the transducers across the disc surface while the drive is not operating.

Using a magnet 460 having approximate dimensions of 0.15 by 0.078 by 0.059 inches (H, L, W) and distancing the magnet from the metal striker by 0.015 inches requires a VCM torque of 1.35 oz-inches/amp to dislodge the actuator arm 118 from the magnetic latch 400 after the disc 100 is rotating at full speed. This arrangement forms a simple, low cost method of latching the actuator arm 118 during storage.

Figure 16:
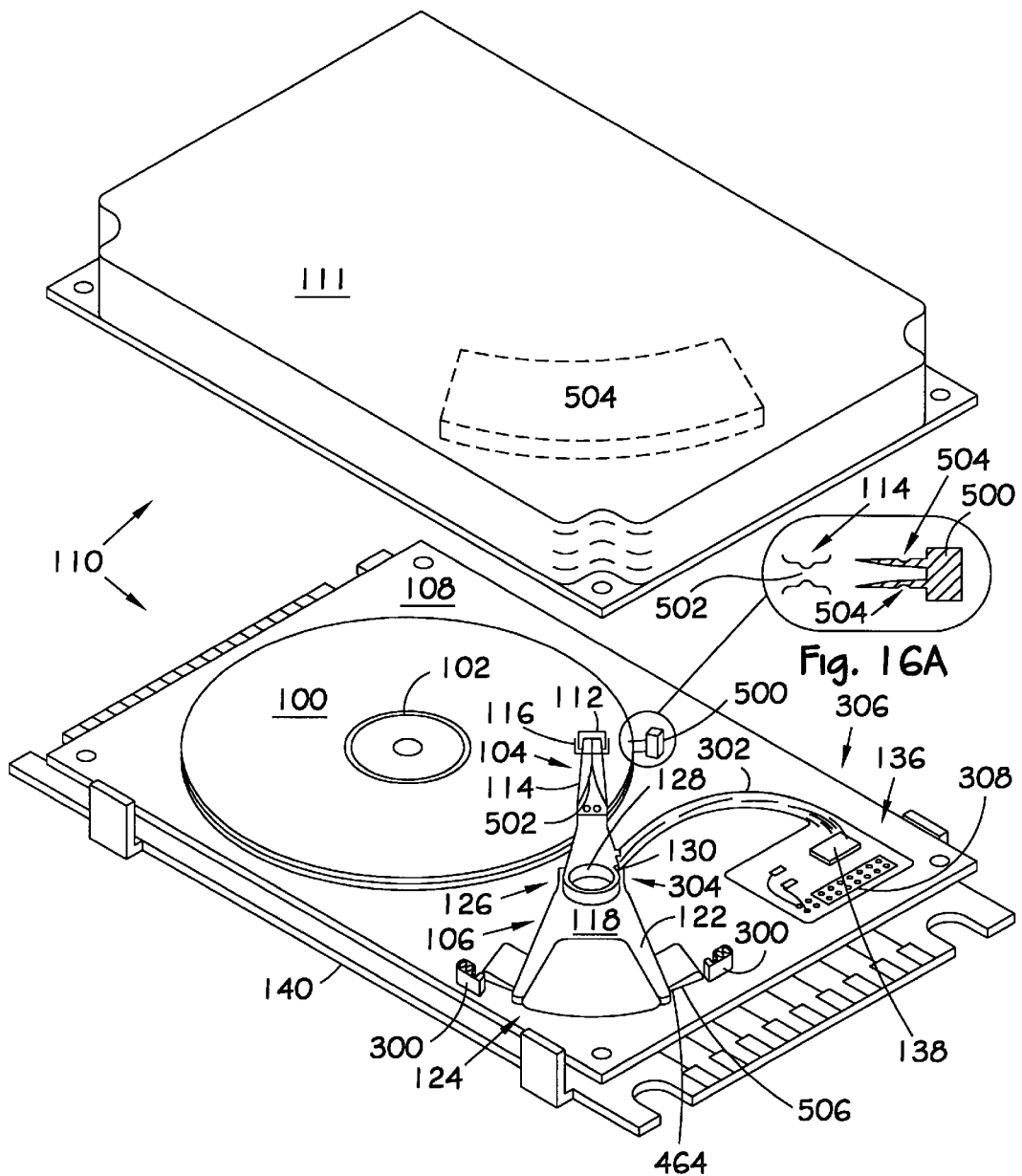
FIG. 16 depicts an alternative embodiment of the invention using a latch in the form of a ramp.

In an alternative transducer parking assembly shown in FIG. 16, an inclined ramp member 500 having one ramp for each transducer assembly 104 is positioned adjacent to the disc 100 and a corresponding ridge forming a cam 502 is incorporated into each flexure 114. Upon power down, the VCM 124 moves the actuator arm 118 toward the ramp 500 engaging the cam 502 with the ramp 500. The VCM 124 forces the cam 502 up the ramp 500, and consequently, lifting the transducer 112 and placing the cam 502 into an indentation 504 in the ramp 500. The indentation 504 maintains the transducer assembly 104 in a stationary parked position even under extreme mechanical shock. Upon restart of the disc drive, the VCM 124 pulls the transducer assembly 104 off of the ramp 500 and positions it above the spinning surface of the disc 100.

In accordance with another feature of the invention, the miniature disc drive system described herein is designed to have a form factor of approximately half that of a current 2.5 inch disc drive. Specifically, disc drive is housed in a two part magnetically permeable housing 216, 108 having the approximate dimensions of 50 mm by 70 mm by 7.5 mm (W, L,H) for a single disc system and having the approximate dimensions of 50 mm by 70 mm by 10 mm (W, L,H) for a dual disc system. Attachment of the main PCB 140 to the underside of the housing 110 adds less than 3 mm to 5 mm to the height dimension. Thus, a single disc system has a height of no more than 10 mm and a dual disc system has a height of no more than 12.5 mm. A disc drive of this type is useful for permanent mounting within a portable computer or as a removable memory unit.

As described previously, to facilitate use as a permanently installed disc drive, a connector arrangement 136 is provided having fifty standard interface pins with 0.079 inch spacing extending through the base 108 of the housing 110. A second, alternative connector is provided with PCMCIA standard interface, using 0.050 centers. The only electronic circuitry located within the housing 110 is a preamplifier 138 which amplifies the signals received from the transducers 112 during the read mode of operation. The remaining electronics, including the spindle motor commutation control circuit, the actuator assembly position control circuit, the power supply circuit and data processing circuits, etc., are located on a both sides of circuit card 140 mounted to the external surface of the housing 110, e.g., the underside of the base portion 108. The electronics mentioned above are essentially the same as those used in currently marketed 2.5 and 3.5 inch disc drives.

As depicted in FIG. 1, access to the signals on the main PCB 140 is, preferably, through an edge connector 600 enabling the disc drive to be plugged directly into the mother-board of the host computer without extra cabling. Alternatively, the control circuitry is fully integrated into the host computer's circuitry and only the electro-mechanical apparatus contained in the housing 110 need be installed in the host. Under this arrangement, a cable or other adapter would attach the connector arrangement 136 to the host; a PCMCIA connector is also available.

Figure 17:
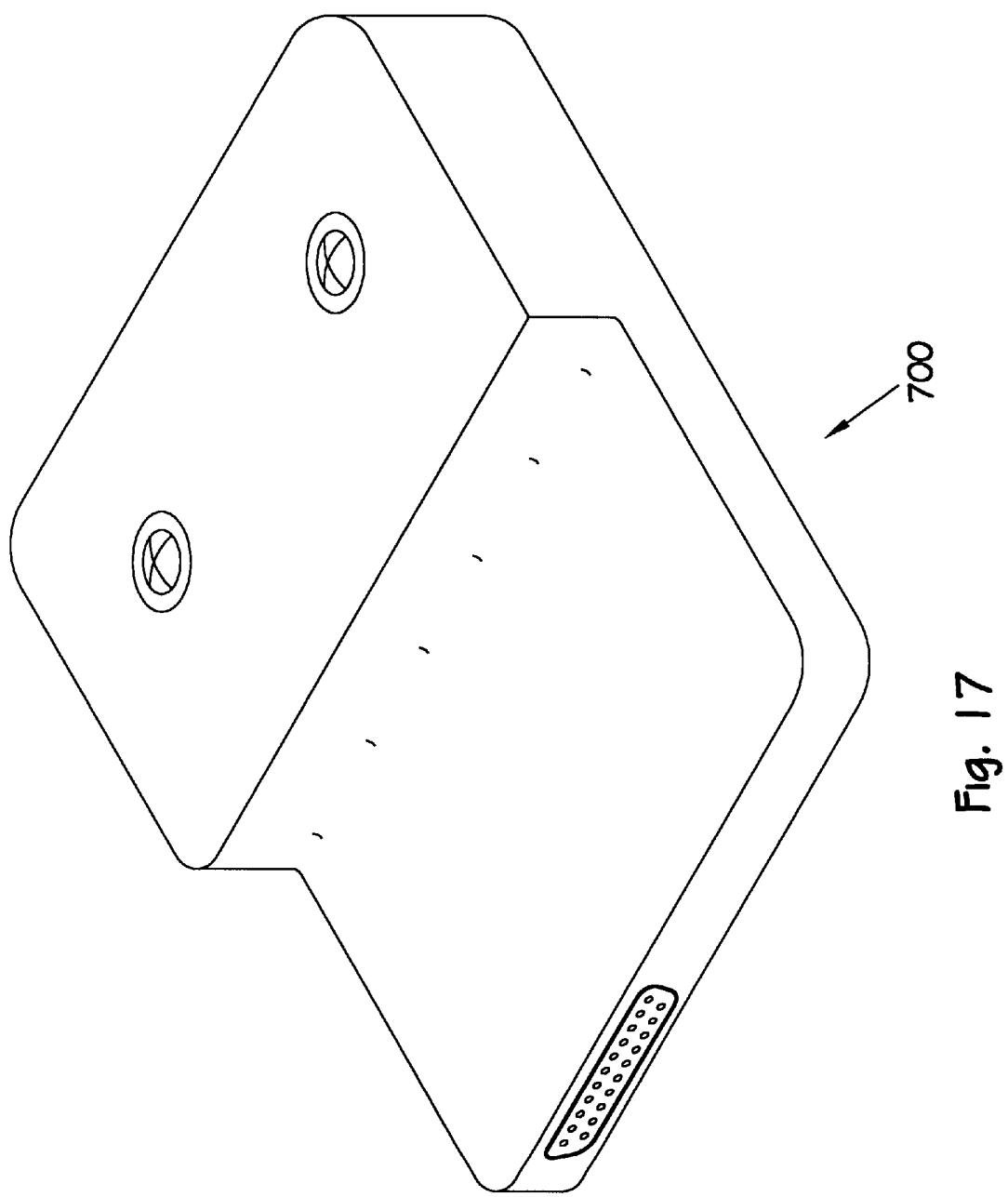
FIG. 17 depicts an alternative embodiment of the miniature disc drive from an isometric view.

In another alternative layout depicted in FIG. 17 having a very slim design on the order of 10 mm maximum, the main printed circuit board 140 carrying the control electronics is mounted adjacent to the disc drive system in the area indicated by reference numeral 700. For manufacturing ease, the control circuitry is mounted upon a flexible printed circuit card material which is backed by a fiberglass circuit card to add rigidity. A single, small eighteen pin connector attaches the control electronics to the disc drive system within the housing. The adjacent assembly structure 700 forms a disc drive having a small height profile, on the order of 10 mm, and maintains a form factor which is equivalent to a standard 2.5 inch disc drive.

Figure 18:
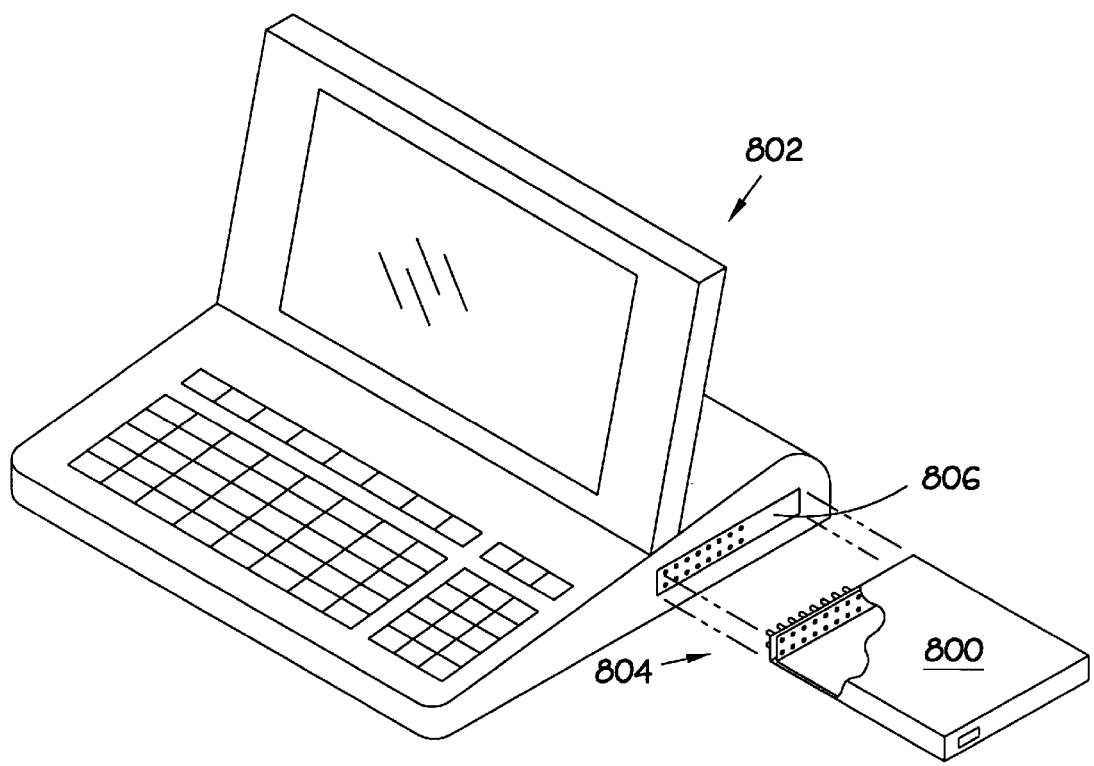
FIG. 18 depicts the miniature disc drive system as a removable memory unit cooperating with a laptop or notebook computer.

In a removable memory unit 800 configuration, as depicted in FIG. 18, all of the aforementioned external circuitry mounted on PCB 140 is integrated into the portable host computer 802. An interface between the memory unit comprising only the electromechanical assemblies which are encased in the housing 110 and the host computer 802 is provided via an easily detachable connector 804. In use, the memory unit 800 is inserted into the computer via a slot 806. Data can be written and read to the disc drive memory unit 800. The unit 800 can be removed to enable another unit to be inserted or the data can be carried and transferred to another computer. In general, the arrangement functions much like a floppy disc except a much larger amount of data is easily transportable, i.e., approximately 32 MBytes of formatted data for a single disc system and twice that for a double disc system.

Each embodiment discussed herein is designed to operate using a five volt power supply (usually in the host computer) and consume less than 3.5 watts of power during operation. Important electromechanical design criteria which are met by each of the embodiments described herein include a mean-time-between-failures (MTBF) in excess of 150,000 hours, at least 100,000 start-stop cycles must be accommodated, and the drive system must withstand in excess of 150 g of mechanical shock during non-operative periods.

Although the invention has been described with a great degree of detail, it is to be understood that numerous changes can be made thereto without departing from the spirit and scope of the invention. The full scope of the present invention is to be limited only by the meaning and range of equivalency of the following claims.

What is claimed is:

1. A low-height computer disc drive system comprising:
   at least one hard disc having a disc inner diameter and a disc outer diameter;
   a disc motor for rotating said hard disc;

an actuator assembly including a transducer for communicating information with said hard disc, and positioning means for moving said transducer with respect to said hard disc, said positioning means including a straight arm actuator and a voice coil motor for selectably positioning said transducer over said hard disc, said voice coil motor includes one or motor stationary magnets attached directly to said housing means in spaced, confrontational arrangement defining a gap through which a voice coil moves;

a circuit connected to said transducer and communicating therewith; and a rigid housing having a base portion and a ceiling portion for enclosing said hard disc, said disc motor, said transducer, circuit, and said positioning means;

said at least one hard disc having a diameter sized to fit within said housing;

said disc motor being mounted with dual-end support at one end to said base portion of said housing and at the other end to said ceiling portion of said housing; and said disc motor having a hub (102) and including a plurality of wire-wound poles (207) forming a stator (204) fixedly mounted to a shaft (206) forming an axis of rotation for said motor;

said hub including a first portion to which said disc (100) is mounted by fitting said first portion within said disc inner diameter, and expanding from said first portion to a second portion having a larger diameter and including an interior annular cavity defining an outer diameter larger than said disc inner diameter and within which said stator is mounted such that said stator (204) extends beyond said disc inner diameter to provide sufficient current handling capability to establish operating motor torque without interfering with said disc (100), while maintaining a small hub (102) diameter at the location where said disc mounts to said hub;

at least one of said base portion and said ceiling portion includes a recess proximate a location provided for said dual-end support sized to receive a fastener for fastening said shaft to said housing without extending the thickness of said disk drive system; and said base and ceiling portions include a metallic portion.

2. The low-height computer disc drive in claim 1, wherein said housing having an overall outer dimension of substantially 70 mm by substantially 50 mm, and a thickness of between substantially 10 mm and substantially 19 mm.

3. The low-height computer disc drive system in claim 1, in which said rotor comprises a single selectively energized coil and said stator comprises first and second magnets.

* * * * *